United States Patent

[11] 3,588,341

[72] Inventor Robert B. Hansen
Arlington Heights, Ill.

[21] Appl. No. 812,014
[22] Filed Apr. 1, 1969
[45] Patented June 28, 1971
[73] Assignee Motorola, Inc.
Franklin Park, Ill.

[54] AUTOMATIC BRIGHTNESS CONTROL CIRCUIT FOR ESTABLISHING THE BLACK LEVEL OF SIGNALS IN A TELEVISION RECEIVER

9 Claims, 1 Drawing Fig.

[52] U.S. Cl. ........................................ 178/7.5DC, 178/5.4R
[51] Int. Cl. ........................................ H04m 5/16
[50] Field of Search ........................................ 178/7.3 (DC), 7.5 (DC), 7.1 (DC)

[56] References Cited

UNITED STATES PATENTS 2,825,758 3/1958 Revercomb ................ 178/7.5(DC)

*Primary Examiner*—Robert L. Griffin
*Assistant Examiner*—Donald E. Stout
*Attorney*—Mueller and Aichele ABSTRACT: In an automatic brightness control circuit for a color television receiver using direct demodulation of the color and brightness signals, the signals present on the base and emitter of the green NPN output transistor amplifier are compared by connecting them across the base-emitter path of a PNP transistor; and whenever the NPN transistor is cut off, indicative of a black level signal, the PNP comparison transistor is rendered conductive. The collector of the comparison transistor is connected through an integrating circuit, the output of which is used to vary the DC operating levels of the three driver amplifiers in a closed loop control system.

PATENTED JUN 28 1971
3,588,341
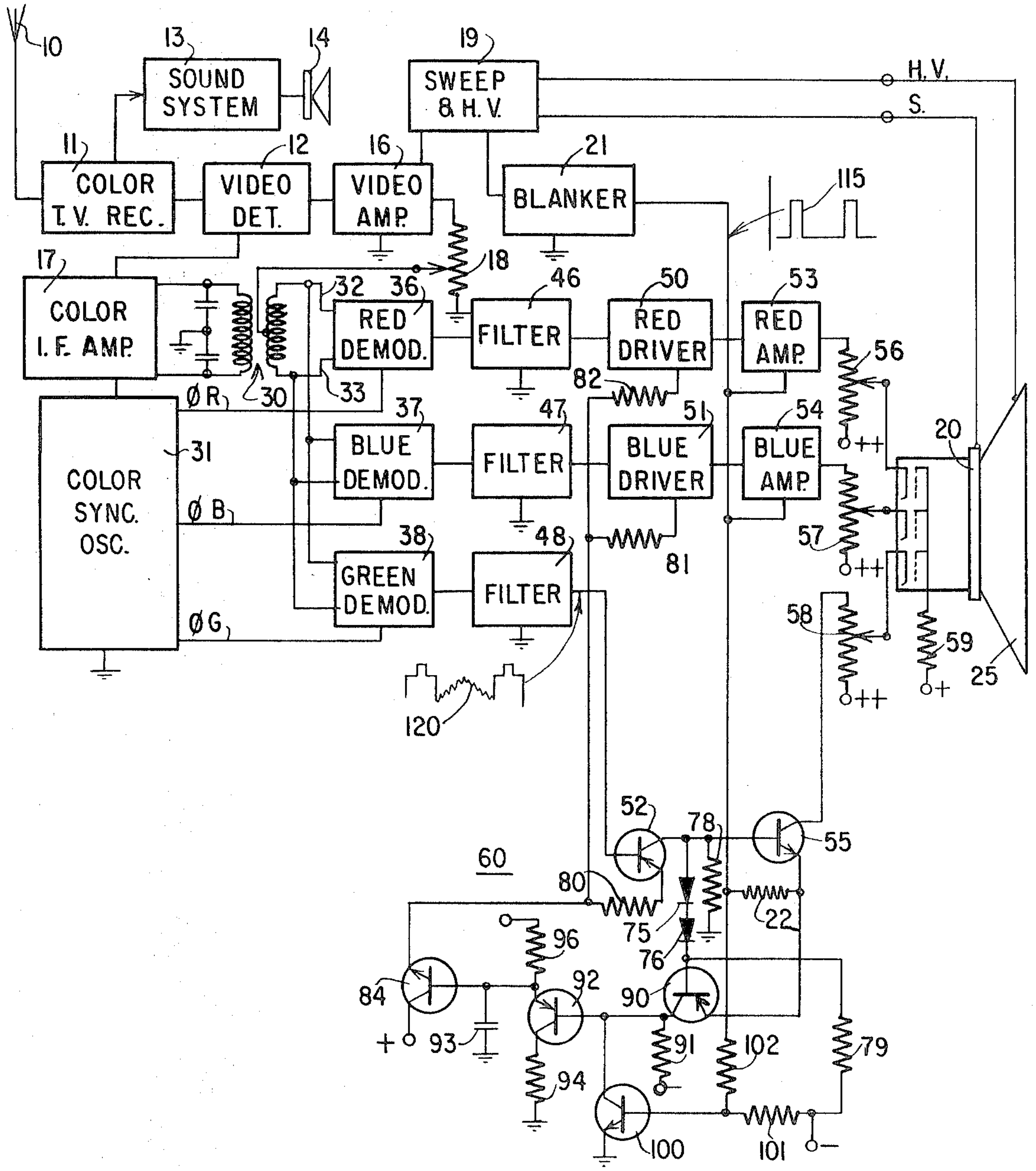
INVENTOR
ROBERT B. HANSEN
BY Mueller, Aichele & Rauner
ATTYS.

AUTOMATIC BRIGHTNESS CONTROL CIRCUIT FOR ESTABLISHING THE BLACK LEVEL OF SIGNALS IN A TELEVISION RECEIVER

BACKGROUND OF THE INVENTION

In most black and white and color television sets there is provided a manual control for adjusting the contrast and brightness settings of the receiver. Automatic brightness control circuits operating during the retrace or blanking intervals and responsive to the synchronizing or blanking pulses for establishing the black level of the cathode-ray tube exist. Such systems however necessarily rely upon accurate black level transmission of the signals during these retrace or blanking intervals in order to provide correct black level reproduction on the cathode-ray tube during the video or trace portion of the signals. Although theoretically the black level transmitted during the retrace portion of the signal is the correct black level, this is not always the case in practical applications of television systems. As a consequence, it is desirable to provide for an automatic brightness control circuit which operates during the video or trace portion of the signal to ascertain the black level of the video signal and to establish this level as the CRT cutoff or black level of operation.

SUMMARY OF THE INVENTION

Accordingly it is an object of this invention to provide an improved automatic brightness control circuit for a television receiver.

It is an additional object of this invention to operate an automatic brightness control circuit for a television receiver during the video or trace portion of the received television receiver.

It is a further object of this invention to compare the input and output of a video amplifier during the trace interval to derive an automatic brightness control signal for a television receiver.

In a preferred embodiment of the invention, a reference voltage level, which is established to indicate the condition of operation of the cathode-ray tube for black level of brightness, is compared with the video signal level during the scanning intervals to derive an output control voltage which is utilized to control the black level of the signals applied to the cathode-ray tube of the television receiver.

BRIEF DESCRIPTION OF THE DRAWING

The sole FIGURE of the drawing is a schematic circuit diagram, partially in block form, of a preferred embodiment of the invention.

DETAILED DESCRIPTION

Referring now to the drawing, there is shown a color television receiver 11 coupled to a suitable antenna 10 for receiving a composite television signal and for selecting, amplifying and converting the radio frequency signal to IF frequency for application to a video detector 12. The color television receiver 11 also is coupled to a sound system 13 which demodulates and amplifies the usual 4.5 mHz. sound subcarrier for reproduction by a speaker 14, as the audio signals of the received composite signals supplied by the antenna 10 to the receiver 11.

The video detector 12 is coupled to a video amplifier 16 and a color IF amplifier 17, which are used to process the brightness and modulated chroma signal components of the received composite signals, respectively. The video amplifier 16 supplies signals to a sweep and high voltage circuit 19 which has an output connected to the deflection yoke 20 located on the neck of a three-gun color cathode-ray tube 25. The sweep and high voltage circuit 19 also provides a high voltage for the screen of the shadow mask of the cathode-ray tube 25 in a conventional manner. In the color IF amplifier stage 17, there is a band-pass filter network for selecting the color subcarrier at 3.58 mHz. and its associated sidebands; and the amplifier 17 includes a gain or color intensity control to furnish a selected amplitude of the chroma subcarrier signal at opposite phases with respect to ground to the primary winding of an output transformer 30.

The IF amplifier 17 also is further coupled to a color synchronizing oscillator 31 which selects the burst signals appearing on the "back porch" of the horizontal synchronizing pulses in order to develop a color reference signal of 3.58 mHz. at three different phases for synchronous demodulation of the chroma or color signals. The three outputs of the oscillator 31 are identified as $\phi$R, $\phi$B and G to designate the phases of reference signals required for demodulating the red, blue and green colors of the modulated chroma signal components respectively.

The output of the video amplifier 16 also is supplied through a contrast control potentiometer 18, the tap of which is connected to the center tap of the secondary winding of the transformer 30. The luminance or brightness signal obtained from the contrast potentiometer 18 may extend in frequency up to or into the chroma subcarrier sidebands.

The secondary winding of the transformer 30 has first and second output leads 32 and 33, with both of these leads carrying the same brightness component with respect to ground since this component is supplied to the center tap of the secondary winding of the transformer 30. The lead 32 carries the modulated chroma subcarrier of one phase, while the lead 33 carries the modulated chroma subcarrier of the opposite phase. These modulated chroma subcarrier signals are oppositely phased with respect to ground and are phase-modulated to represent hue and are amplitude modulated to represent saturation. The leads 32 and 33 each are coupled to three direct color signal demodulators 36, 37 and 38. In addition, the red, blue and green phase reference signals from the output of the color sync oscillator 31 are applied to the demodulators 36, 37 and 38, respectively, in order to provide direct demodulation of the signals applied to the inputs of these demodulators.

The outputs of the demodulators 36, 37 and 38 are supplied through associated filters 46, 47 and 48 which are provided to trap the 3.58 reference signal and pass the desired red, blue and green video output signals to three driver circuits 50, 51 and 52, respectively. Three amplifier circuits 53, 54 and 55 are driven by the outputs of the driver circuits and the outputs of the amplifier circuits are coupled through variable resistors 56, 57 and 58 to corresponding cathodes of the three-beam cathode-ray tube 25. Associated grids of these cathodes are coupled to a suitable bias source in common through a resistor 59, and the cathode-ray tube operates in accordance with well-known shadow mask principles to reproduce a monochrome or full-color image in accordance with the video drive signals applied to it.

It is to be noted in conjunction with the foregoing description, that the red and blue drivers 50, 51 and amplifiers 53, 54 have been shown in block form, whereas the green driver 52 and green output amplifier 55 are shown as PNP and NPN transistors, respectively. In FIG. 1 the output taken from the emitter of the video amplifier 55 is supplied to one input of a closed loop automatic brightness control circuit 60, the output of which then is supplied to the emitters of the transistors in the drive circuits 50, 51 and 52 through suitable coupling resistors 80, 81 and 82 to vary the DC voltage supplied to the driver transistors 50, 51 and 52. This in turn varies the black level or brightness of the signal applied by the amplifiers 53, 54 and 55 to the corresponding cathodes in the cathode-ray tube 25.

In the receiver generally described thus far, there may be additional circuitry which is known and which has not been disclosed in detail in order to simplify this disclosure. For example, there may be a gated automatic gain control system, a color killer system for interrupting the amplifier 17 in the absence of the color signal, as well as other circuitry not known in commercially produced color television receivers. It should further be noted that it is preferable for the video detector 12 to be direct current coupled through all of the succeeding amplifiers and demodulators directly to the cathodes of the picture tube 25 in order to maintain the DC component of the signals processed in the various translation paths.

In order to simplify the operation of a television receiver to the greatest extent possible, it is desirable to provide for automatic operation of the set, including automatic adjustment of the contrast and brightness controls if possible. A suitable circuit which may be used to perform the function of automatic brightness control is shown in the circuit 60, which operates by monitoring the output of the green output amplifier 55 during the scan intervals of the received composite television signals.

In the operation of a DC coupled color television receiver, black level information is obtained by cutting off the corresponding gun of the cathode-ray tube. This may be effected by the output amplifier 55 when the output amplifier 55 is just rendered nonconductive. The voltage present on the emitter of the transistor 55 then is equal to or more positive than the voltage present on its base, and this condition can be monitored and detected by a PNP monitoring transistor 90 having its base connected to the base of the transistor 55 through a pair of semiconductor diodes 75, 76 and its emitter connected to the emitter of the transistor 55. The diodes 75 and 76 are necessary to provide a forward voltage drop thereacross equal to or slightly greater than the voltage drop across the base-emitter junction of the transistor 55, so that the transistor 90 is forward biased when the transistor 55 is nonconductive.

The desired black level operation of the green gun of the cathode-ray tube 25 is established by providing a predetermined ratio of the potential obtained from the tap on the potentiometer 58 with the potential applied to the G-2 electrodes through the resistor 59 from the source of positive potential. During the time when signal levels other than black are being supplied to the cathode-ray tube, the transistor 55 is in varying states of conductivity; and in this condition, the potential on its emitter is more negative than the potential on its base, causing the transistor 90 to be back-biased and rendered nonconductive. This is the condition for white-going information. When the transistor 90 is nonconductive, a relatively negative potential appears on its collector through the collector resistor 91 which is connected to a source of negative potential. This negative potential is applied to the base of a PNP amplifier transistor 92 to render that transistor conductive providing a discharge path for a capacitor 93 through the transistor 92 and a collector resistor 94 to ground.

The value of the collector resistor 94 is relatively high, so that it provides a relatively long discharge time for the capacitor 93. As the voltage on the capacitor 93 is reduced, a lower potential appears on the base of the NPN emitter-follower transistor 84, to render the transistor 84 less conductive. Thus, the potential applied from the emitter of the transistor 84 through the coupling resistors 80, 81 and 82 to the emitters of the driver stages 50, 51 and 52 is less positive lowering the DC operating level thereof. This reduces the drive to the amplifier transistors 53, 54 and 55 to reduce the beam intensity and thereby reduce the brightness.

On the other hand, for a condition when the transistor 55 is cut off, which occurs for black level signals or for blacker-than-black conditions, the transistor 90 has substantially ground potential applied to its emitter from the emitter of the transistor 55 since, during the trace interval, the output from a blanker circuit 21, controlled by the sweep circuit 19, is at ground potential and is applied to the emitter of the transistor 55 through a coupling resistor 22. At the same time a more negative potential is applied to the base of the transistor 90 through a voltage divider consisting of a resistor 78, the diodes 75 and 76, and a resistor 79 connected between ground and a source of negative potential. This causes a relatively positive potential to be applied to the base of the transistor 92 rendering that transistor nonconductive. In this condition of operation, the capacitor 93 is rapidly charged from a source of positive potential through a resistor 96 and thereby applies a more positive biasing potential to the base of the transistor 84. This renders the transistor 84 more conductive which causes a more positive potential to be applied to the emitters of the driver stages 50, 51 and 52 to raise the brightness level or beam intensity of the cathode-ray tube 25. The parameters of the circuit including the capacitor 93 and the resistors 94 and 96 are chosen so that the desired black level of the circuit is maintained and corresponds to the peak black levels of the video signal obtained over a number of scanning intervals.

During the blanking interval, a positive pulse is obtained from the blanker circuit, as is shown in the waveform 115, and is applied through the resistor 22 to the emitter of the transistor 55 to cut the transistor 55 off. At the same time, a relatively negative signal is applied to the base of the transistor 55, which normally would render the transistor 90 heavily conductive and which would indicate black-going information in the received signal level. In order to prevent the operation of the blanker circuit and the blanking of the output amplifiers 53, 54 and 55 from having any affect on the operation of the automatic brightness control circuit, however, an inhibit gate in the form of an NPN transistor 100 is provided to shunt the signals present on the collector of the transistor 90 to ground during the blanking interval.

The transistor 100 normally is rendered nonconductive by the application of a negative biasing potential to its base through a coupling resistor 101. During the blanking interval, however, the positive blanking pulses are applied through a resistor 102 to the base of the transistor 100, rendering it fully conductive. This effectively shunts the base of the transistor 92 to ground, causing the transistor 92 to be rendered conductive which is its normal condition for white-going information. During the scanning intervals of operation, however, the transistor 100 is nonconductive and acts as an open switch in the circuit. Thus, the transistor 100 operates only to prevent erroneous appearing black-going information from charging the capacitor 93 during the blanking intervals.

The automatic brightness control circuit, shown and described above, operates to adjust the black level of the television signal reproduced on the cathode-ray tube screen to the peak blackest-going portion of the received video signal during trace intervals and is independent of erroneous transmission of black level signals during the blanking or synchronizing intervals of the transmitted signal. This automatic brightness control circuit is especially desirable in a television receiver also including an automatic contrast control circuit, so that it is unnecessary for the viewer to manually adjust the set to obtain the most desirable brightness and control settings.

I claim:

1. In a television receiver including a cathode-ray tube having trace and retrace intervals of operation, a source of video signals including a range of brightness components extending from a black voltage level to a white voltage level during the trace intervals of operation of the cathode-ray tube, and an amplifier stage coupling the source of video signals to the cathode-ray tube, an improvement therein comprising an automatic brightness control circuit including in combination:

means for establishing a predetermined voltage reference level which is a function of the level of video signals applied to the amplifier stage which cause a black level of brightness to exist in said cathode-ray tube;

means for comparing the predetermined voltage reference level and the voltage level of said video signals and operative during said trace intervals to provide an output indicative of the difference between the voltage reference level and the voltage level of said video signals; and means responsive to the output of the comparing means for controlling the black level of signals applied to said amplifier stage.

2. A television receiver according to claim 1 wherein the amplifier stage includes an output amplifier, having an input and at least one output electrode, for supplying signals to the cathode-ray tube, with the video signals being applied to the input of said output amplifier, and wherein the means for establishing a predetermined voltage reference level establishes said predetermined voltage reference level at said output electrode of said output amplifier when said cathode-ray tube is being operated at said black level.

3. The combination according to claim 2 wherein the comparing means compares the voltage level of the video signals applied to said input of the output amplifier with the voltage level present on said output electrode of the output amplifier.

4. The combination according to claim 2 wherein the output amplifier is a transistor amplifier having collector, base, and emitter electrodes, the predetermined reference voltage level is established at the emitter of said transistor amplifier, and the video signals are applied to the base thereof.

5. The combination according to claim 4 wherein the comparing means includes a second transistor of opposite conductivity type to the output transistor, said second transistor having base, emitter, and collector electrodes, with the bases and emitters of the output transistor and the second transistor being connected in common, the magnitude of the video signals applied to the bases of said transistors relative to the predetermined reference voltage established at the emitters of said transistors forward biasing the output transistor amplifier to conduction and reverse biasing the second transistor to nonconduction for voltage levels of video signals indicative of brightness components brighter than black, and reverse biasing the transistor amplifier to nonconduction and forward biasing the second transistor to conduction for voltage levels of video signals indicative of brightness components black or blacker than black, with the collector of the second transistor providing a first output voltage with the second transistor being rendered nonconductive and providing a second output voltage with the second transistor being rendered conductive, the collector of the second transistor being coupled with the means for controlling the black level of signals applied to said amplifier stage.

6. The combination according to claim 5 further including means for inhibiting the output of the second transistor during the retrace intervals of operation of the cathode-ray tube.

7. The combination of claim 5 further including an integrating circuit and a control circuit, wherein the collector of the second transistor is connected through said integrating circuit to said control circuit for controlling the signal level of the signals applied to the base of the output transistor amplifier.

8. The combination according to claim 7 further including a driver amplifier stage for supplying signals to the input of the output transistor amplifier, wherein the video signals are applied to the driver stage and the output of the control circuit is connected to the driver amplifier stage to vary the gain thereof.

9. The combination according to claim 7 wherein the integrating circuit includes a charging resistor and a capacitor connected in series at a junction between a source of charging potential and a point of reference potential in the order named, a discharging resistor and a switching transistor having collector, base, and emitter electrodes, with the emitter-collector path thereof being connected in series with the discharging resistor between the junction and said point of reference potential, the base electrode of the switching transistor being connected with the collector electrode of the second transistor, with the switching transistor being rendered conductive in response to the first output voltage, and the switching transistor being rendered nonconductive in response to the second output voltage, the values of the charging and discharging resistors causing the capacitor to be charged rapidly with the switching transistor nonconductive and to be discharged slowly through the switching transistor and the discharging resistor with the switching transistor conductive, the control circuit being coupled to said junction and causing the signal level of the signals applied to the base of the output transistor amplifier to drift toward a voltage level corresponding to a black voltage level with the switching transistor being conductive, and causing the signal level of the signals applied to the base of the output transistor amplifier to drift toward a white voltage level with the switching transistor being rendered nonconductive.